July 1, 1941. W. J. VINCENT ET AL 2,247,931
METHOD OF AND APPARATUS FOR TRAPPING ANIMALS
Filed Feb. 6, 1939 2 Sheets-Sheet 1
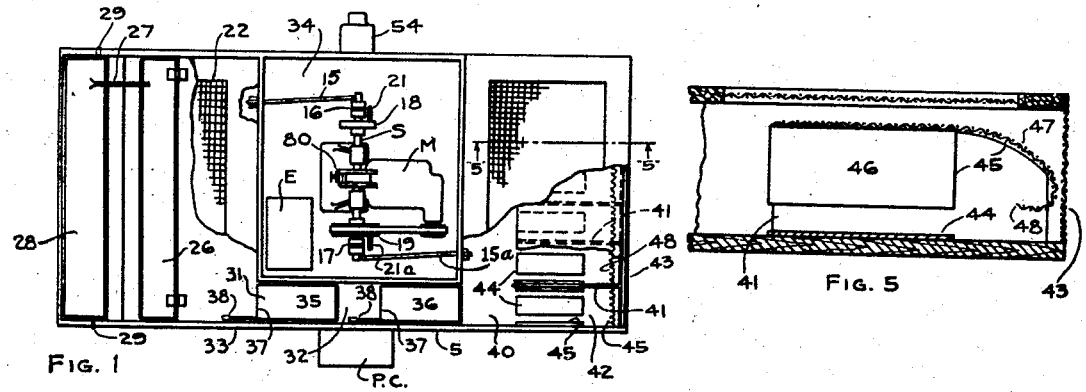
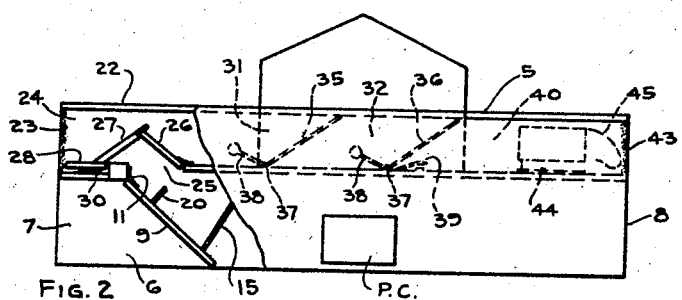
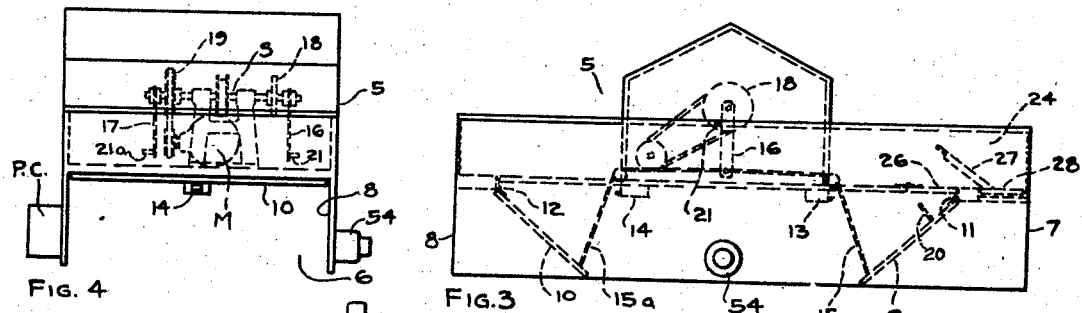
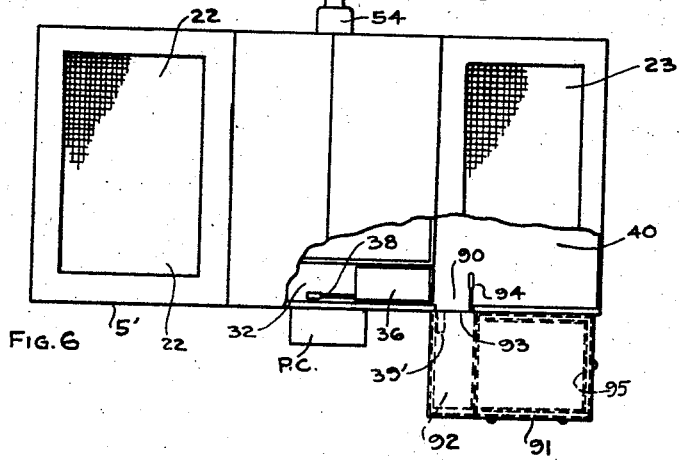
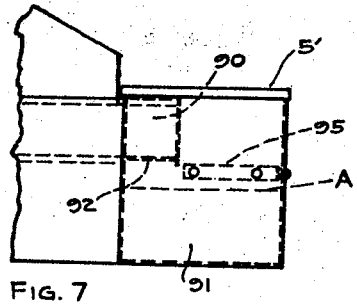
INVENTOR.
W. J. VINCENT
C. M. STANTON
BY
D. Clyde Jones
ATTORNEY.

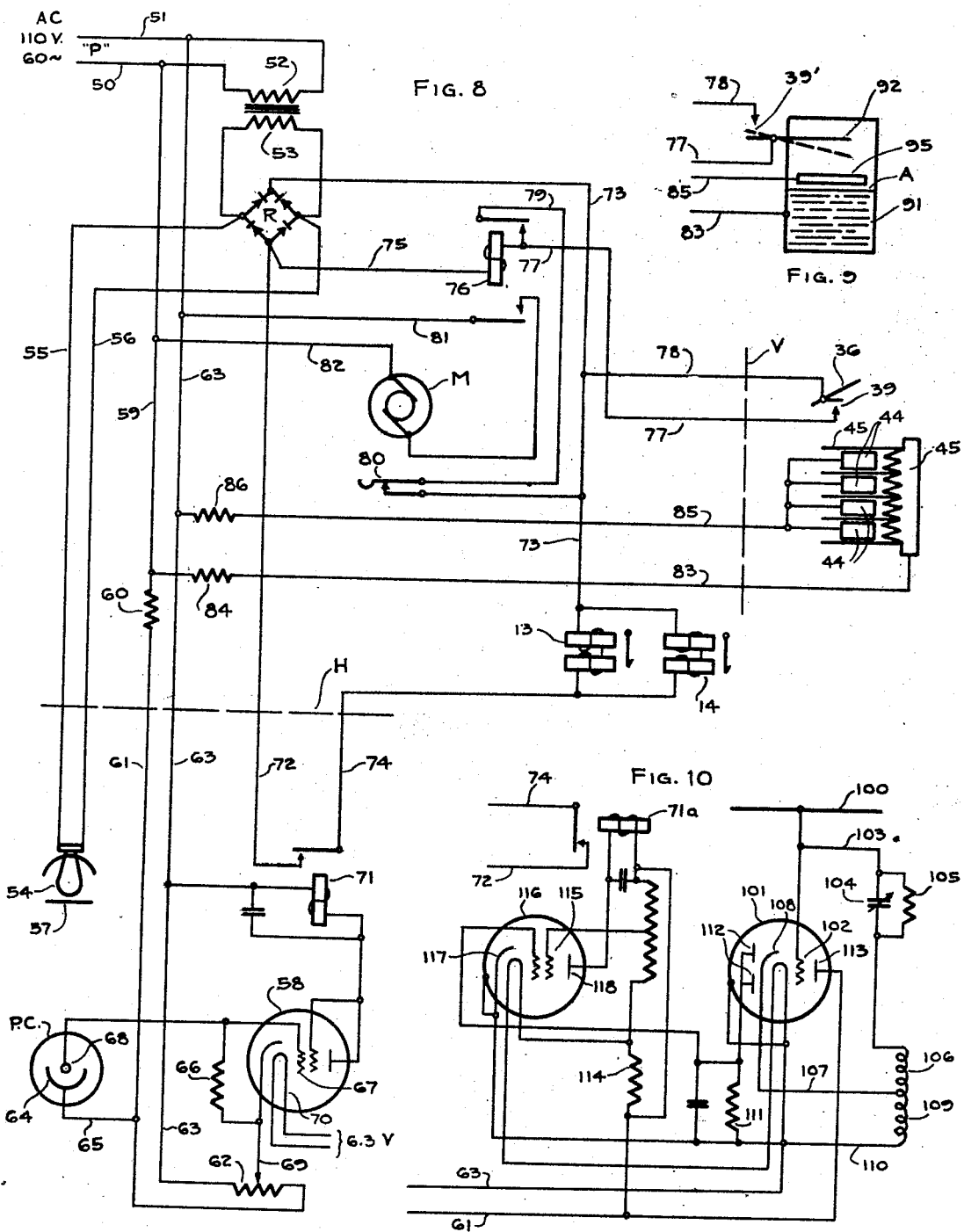

Patented July 1, 1941

2,247,931

UNITED STATES PATENT OFFICE 2,247,931

METHOD OF AND APPARATUS FOR TRAPPING ANIMALS

William J. Vincent and Cornelius M. Stanton, Rochester, N. Y.

Application February 6, 1939, Serial No. 254,868

12 Claims. (Cl. 43—76)

This invention relates to animal traps and to a method of trapping animals.

In prior animal traps it has been necessary either for the animal to make physical contact with a trigger or the like in order to spring the trap or it has been necessary for the animal to run up a ramp or the like to a trap door which drops him into a cage. Such traps have so modified the usual appearance of the runway, to which the animal is accustomed, that the animal immediately becomes suspicious and avoids the trap. Also in prior traps, the animal has been kept alive and in his struggles to escape, frightens away other animals that might otherwise be captured.

It has also been proposed to provide an arrangement for electrocuting animals to be disposed of. However, in these prior arrangements either the animal was not confined within a small space so that he was free to spring or jump away from the electrodes or the electrodes comprised only flat plates with resulting poor electrical contact with the animal apparently due to the insulation afforded by the animal's fur, so that differences in potential as high as 500 volts and even 1000 volts were required to destroy the animal. This necessary high difference of potential between the electrodes becomes a serious hazard to humans and necessitates immediate removal of the animal's body from the electrodes, otherwise the continued application of the high voltage current would cause it to be consumed with the resulting objectionable stench of burning flesh.

In accordance with the main feature of the present invention, it is proposed to provide an animal trap having a tunnel or passageway therethrough which trap is adapted to rest on the floor of the building or the like where the trap is set. Thus the bottom of the passageway will be the unchanged floor of the room or path to which the animal is accustomed and in this way the floor of the usual runway of the animal is not modified. In addition, it is not necessary for the animal to physically engage any trigger or other mechanical part to put the trap into operation, since the presence of the animal in the passageway of the trap is sensed by its interception of a beam, preferably of invisible energy such as infra-red light, directed toward a photo-electric cell controlling electrical circuits for operating the trap mechanism. Alternatively, the presence of the animal in the passageway so changes the electrostatic constants of certain electrical circuits that the circuits operate the trap mechanism to capture the animal. Furthermore, the animal is not required to run up any ramp until after it has been captured, then, however, he follows a path which appears to offer a way of escape but instead leads either to one or more stalls each having a pair of charged electrodes therein, or alternatively to a tank containing water. Where the animal is disposed of electrically only a low potential of electrical energy is required. Where water is used to destroy the animal, there is provided, just above the surface of the water in the tank, an electrode charged with electricity so that the animal in his attempt to escape from the water touches this electrode and receives a shock sufficient to cause him to drop back into the water and there drown. By either of these arrangements, the animal is destroyed with a minimum amount of struggle or noise and consequently does not frighten away other animals. Also in these arrangements, as soon as the animal is disposed of, the trap is reset automatically.

A further feature of the invention relates to a novel method of trapping animals.

The various other features and advantages of the invention will appear from the detailed description and claims when taken with the drawings in which:

Fig. 1 is a plan view of the trap of the present invention with fragments of the top portion thereof broken away to indicate more clearly the internal construction of the trap;

Fig. 2 is an elevation of one side of the trap with a portion of the wall thereof broken away to illustrate the mounting of one of the end gates and the arrangements for temporarily retaining the door in the escape passage open, and showing the relation of these parts immediately after the animal has been trapped;

Fig. 3 is a side elevation of the opposite side of the trap from that illustrated in Fig. 2, the position of the trap mechanism after the animal has entered the upper compartment of the trap being shown by dotted lines;

Fig. 4 is an end view of the trap, looking from the right end of Fig. 2, as it appears when set;

Fig. 5 is a fragmentary cross-sectional view taken on line 5—5 of Fig. 1;

Fig. 6 is a plan view of a slightly modified form of trap with a portion of the top broken away to indicate more clearly the internal construction of the trap;

Fig. 7 is a fragmentary elevation of one side of the trap shown in Fig. 6.

Fig. 8 is a diagrammatic showing of a circuit arrangement suitable for sensing the presence of the animal in the passageway and for operating certain of the parts of the trap shown in Figs. 1 to 5;

Fig. 9 is a diagrammatic showing of a modified circuit arrangement for certain of the parts of the trap shown in Figs. 6 and 7, which arrangement can be substituted for the portion of Fig. 8 illustrated to the right of the vertical broken line thereof; and Fig. 10 is a diagrammatic showing of a modified arrangement for sensing the presence of the animal in the passageway, which arrangement can be substituted for the portion of Fig. 8 illustrated below the horizontal broken line thereof.

The mechanical structure of the trap illustrated in Figs. 1 to 5 inclusive comprises a receptacle or box 5 preferably of greater length than width. This box is open at its bottom and has a rectangular opening in each of its ends, providing a tunnel or main passageway 6 through which the animal can pass. Since the trap is set by placing it on the floor or ground with the floor of the passage 6 common with the previous runway of the animal, the path of the animal will not be modified in any way.

The openings 7 and 8 in the respective ends of the trap are adapted to be closed by main gates 9 and 10. As best illustrated in Figs. 2 and 3, these gates are hinged as at 11 and 12 respectively to parts of the receptacle so that when unrestrained, the gates will fall by gravity to positions indicated in Figs. 2 and 3. Normally however, the gates 9 and 10 are held in a horizontal position (see Fig. 4) by latch magnets 13 and 14, the latches of which are released by means responsive to the presence of the animal in the passageway 6 as will be hereinafter described. The hinges 11 and 12 may be of any desired construction, but it is preferred to use spring hinges to insure rapid and positive closing of the gates when the latches are released. Each of the gates 9 and 10 near its lower edge has connected thereto, an end of one of the strings 15 and 15a or the like, the other end of each string being connected to the respective crank arms 16 and 17 which are adapted to rotate for the purpose of elevating the gates to a horizontal position where they are engaged by the latches of the magnets 13 and 14. The crank arms 16 and 17 are rotatably mounted on a shaft S driven by a motor M. This motor, as will be further described, is set into operation when the animal has been disposed of and rotates the shaft S and the pulleys 18 and 19 secured thereon, approximately one revolution to restore the trap to its set position. These pulleys are respectively provided with eccentrically positioned pins 21 and 21a which move in the path of their related crank arms 16 and 17 to carry them slightly more than one-half of a turn thereof raising the gates 9 and 10 to their horizontal position (Fig. 4), where the gates are retained in their latched position. The motor automatically returns the pulleys to their original position (Figs. 1 and 3) while the arms 16 and 17 again assume the position shown in Fig. 3 to provide slack in the strings 15 and 15a.

The left end portion of the receptacle as shown in Fig. 2 is provided with windows 22 and 23 covered by screening and thus appears to offer a way of escape for the captured animal. When the gate 9 is in its lower position (Fig. 2), it serves as a ramp up which the animal runs toward these windows. Just below the window 22 there is provided a compartment 24 having an opening 25 in the bottom thereof adapted to be closed by a gate or trap door 26. This trap door is hinged to the bottom of the compartment and is normally held in its elevated position as shown in Fig. 2 by means of a catch 27. This catch is fixed to a movable portion or false floor 28 of the bottom of the compartment and is pivoted to rock about the pivot points 29. A leaf spring 30 tends to swing the movable portion 28 and its latch 27 in a clockwise direction as viewed in Fig. 2. Thus when the animal runs up the gate 9, which now serves as a ramp, and steps on the false floor 28, this floor moves in a counterclockwise direction and thereby releases the latch 27 so that the trap door 26 drops to a horizontal position (Fig. 3), to prevent the animal from retracting its course back to the tunnel 6.

The compartment 24 has an opening 31 in one side, which communicates with a passage 32 provided between the side wall 33 of the trap and the apparatus compartment 34. The weight of the animal, as it runs through the passage 32, opens the gates 35 and 36 which are pivoted at 37 and normally held closed by means of the counter-weighted arms 38. Thus retreat of the animal after passing these gates is prevented. As will appear in the later description, downward movement of the gate 36 caused by the weight of the animal in passing over this gate, closes the circuit switch 39 to reset the trap.

The passage 32 opens into compartment 40 at the end of the trap remote from the compartment 24. The compartment 40 is provided with a number of spaced partitions 41 dividing it into a series of stalls 42. The screened window 43 in the end wall of this compartment appears to offer a way of escape to the animal. When the animal runs toward this window he enters one of the stalls and comes in contact with the charged electrodes 44 and 45 and is electrocuted. Each of the electrodes 44 disposed on the floor of the stalls are connected to one side of a commercial power source P as shown in Fig. 8. The other electrode 45 which comprises the metallic plates 46 and the metallic screen 47 conductively connected thereto, is connected to the other side of the commercial power source (Fig. 8). The screen 47 is bent downwardly as indicated in Figs. 2 and 5, its free edge being jagged as shown at 48 in Fig. 1. From numerous observations and tests made with the trap it has been found that the trapped animal either attempts to bite the jagged edge 48 of the screen or that this jagged edge penetrates the fur and breaks the skin of the animal insuring a good electrical contact with the animal.

In Fig. 8 there is diagrammatically illustrated a circuit arrangement for operating the trap illustrated in Figs. 1 to 5 inclusive. It will be understood that the trap will be connected to a commercial source of electrical power P herein illustrated as being 110 volt alternating current at a frequency of 60 cycles. Current from this source is supplied over the conductors 50 and 51 to the primary winding 52 of a step down transformer, the secondary winding 53 which is connected to the input of a rectifier R serving to afford a source of low voltage direct current for operating the various relays and magnets. An incandescent lamp 54 is connected by the conductors 55 and 56 to the mentioned secondary winding in multiple with the bridge rectifier R. The lamp 54 which is continuously lighted during the operation of the trap, projects its rays thru a filter 57 to furnish a beam of infra-red light. This beam of infra-red light is normally projected across the passageway 6 to a photoelectric cell PC so positioned that the passing of the animal through the passageway cuts off the beam of light from the photoelectric cell. This cell has associated therewith an amplifier 58, both of which are connected in a circuit from the alternating current source. This circuit is traceable from one side of the source over conductors 50 and 59, resistor 60, which may be a 25 watt lamp, conductor 61, potentiometer resistor 62, conductors 63 and 51 to the other side of the alternating current source. The electrode 64 of the photoelectric cell PC is connected to conductor 61 by the conductor 65. The cathode of the amplifier 58 is conductively connected through a resistor 66 to the amplifier grid 67 and to other electrode 68 of the photoelectric cell, the cathode also being connected in multiple to the movable contactor 69 of the potentiometer 62. The heater 70 of the amplifier is energized from a 6.3 volt source such as the secondary winding (not shown) of the power transformer.

In operation, the potentiometer 62 is so adjusted that when current is flowing through the photoelectric cell PC, that is, when infra-red light is falling thereon, the grid of the amplifier will be maintained at such a negative potential that plate current will not flow in the output or plate circuit of the amplifier. However, when the beam of infra-red light from the lamp 54 is intercepted, no current will flow through the photoelectric cell and the potential now present on the grid of the amplifier will be such that the relay 71 in the plate circuit of the amplifier will operate. While the relay 71 is operated it closes its armature and front contact thereby completing a circuit from one terminal of the output of the rectifier R, conductor 72, front contact and armature of relay 71, conductor 74, windings of the latch magnets 13 and 14 in parallel, conductor 73 and thence to the other output terminal of the rectifier.

In use, the trap is set over the normal runway of the animal and is connected to a commercial power source so that infra-red light from the lamp 54 is normally incident on the photoelectric cell PC. When an animal enters the tunnel 6 and intercepts the beam of light, the photoelectric cell is no longer energized so that the vacuum tube amplifier 58 passes plate current which energizes the relay 71. With this relay energized the latch magnets 13 and 14 are operated to release the gates 9 and 10. The animal then runs up the gate 9, which serves as a ramp, into the upper compartment 24. When it reaches the upper compartment it steps on the false floor 28 causing the latch 27 connected thereto to disengage the trap door 26. The only way of escape for the animal from the compartment 24 is through the opening 31 leading into the passage 32. The animal then runs along this passage, past the gates 35 and 36 until it reaches the compartment 40.

As the weight of the animal on the gate 36 rocks this gate in a clockwise direction, as viewed in Fig. 2, the switch contacts 39 (Figs. 2 and 8) are closed. The closure of these contacts completes a circuit from one output terminal of the rectifier R, conductor 75, winding of the relay 76, conductor 77, contacts 39 now closed, conductors 78 and 73 to the other output terminal of the rectifier. Relay 76 when thus energized locks itself in operated condition in a circuit including conductor 75, winding of the relay 76, its front contact and armature, conductor 79, normally closed contacts of the cam switch 80, conductor 73 to the output terminal of the rectifier. Thus the relay 76 is maintained energized until a predetermined point in the operation of motor M. As soon as the relay 76 is energized, an operating circuit for the motor M is closed from one side of the alternating current source, conductors 51, 63 and 81, armature and front contact of relay 76, winding of the motor M, conductor 82 and thence over conductors 59 and 50 to the other side of the source of alternating current. Under the control of this circuit, motor M operates and rotates the crank arms 16 and 17 to restore the gates 9 and 10 to a horizontal position where they are held by the latches of magnets 13 and 14. As the gate 9 is raised the pin 20 carried thereby moves the trap door 26 upwardly until it is engaged by the latch 27. Thus the trap is automatically reset in condition to repeat the cycle of operation in catching another animal. After the motor has advanced to the point where it has effected the restoration of these gates, the cam switch 80 on the motor shaft is momentarily opened so that the relay 76 deenergizes and the operating circuit of the motor is interrupted. It should be mentioned that the motor should rotate the crank arms 16 and 17 slightly beyond dead center so that they may return to their lower position whereby there will be sufficient slack in the cords 15 and 15a to insure that these cords will not impede the dropping of the gates when they are unlatched.

The animal now trapped in the compartment 40, enters one of the stalls in attempting to escape by way of the screened window 43. In so doing the feet of the animal rest on the electrode 44 while his body and head engage the electrode 45 to close a circuit including the power source. This circuit is traceable from one side of the power source P, conductors 50 and 59, limiting resistor 84, which preferably may be a 40 watt lamp, conductor 83, electrode 45, the body of the animal, electrode 44, conductor 85, limiting resistor 86, which is also preferably a 40 watt lamp, conductors 63 and 51 to the other side of the power source P. The various elements of the circuits such as the lamps, transformers, relays and vacuum tube may conveniently be arranged in the box E, shown in Fig. 1.

The animal's first reaction to the charge of electricity is to jump away. However, since he is confined within the stall the electricity will continue to flow through his body resulting in his electrocution. It has been found that by confining the animal within a small space and using at least one electrode which is capable of penetrating the fur on the animal, that the ordinary commercial supply of electricity of 110 volts A. C. is sufficient to cause electrocution of the animal. With prior known arrangements for electrocuting animals where only flat plate electrodes were used differences in potentials as high as 1000 volts were insufficient to destroy the animal since he would either jump away from the electrodes or the electrical contact of the electrodes with animal was poor apparently due to the insulation offered by the animal's fur.

The modified trap 5' shown in Figs. 6 and 7 is identical in construction and operation with the trap illustrated in Figs. 1 to 5 inclusive except that there has been provided an alternative arrangement for destroying the animal. In this trap the partitions 41 and electrodes 44 and 45 may, if desired, be omitted from the compartment 40. The compartment 40 is provided with an opening 90 which leads into the top of a tank 91, attached to the front of the trap at the right end thereof as viewed in Fig. 6. The weight of the animal, as it runs through this opening and into the tank tilts the trap door 92 pivoted at 93 and normally held in its horizontal position by means of a counterweight 94, depositing the animal into the tank. The tank 91 is intended to have a supply of water therein approximately to the level indicated by the arrow A in Fig. 7. In the tank, there is mounted an electrode 95 slightly above the normal level of the water which electrode is insulatedly supported on the wall of the tank and extends about a substantial portion of its perimeter.

In Fig. 9 there is shown a fragmentary circuit arrangement for the modified trap 5', which arrangement can be substituted for the electrodes 44 and 45 and switch 39 by connecting the conductors 76, 77, 85 and 83 of the diagram of Fig. 9 to the portion of similarly designated conductors to the left of the vertical broken line V of Fig. 8. One wall of the tank 91 is electrically connected by the conductor 83 through the limiting resistor 84, and through the conductors 58 and 59 to one side of the alternating current source. The electrode 95 mounted adjacent certain of the walls of the tank is electrically insulated therefrom and is connected by the conductor 85, resistor 86, conductors 63 and 61 to the other side of the alternating current source. Thus, when the animal is swimming about in the water, he will engage the electrode 95 and will receive an electric shock so that he drops back into the water and drowns without any appreciable noise which would frighten other animals away. If desired, the circuit switch 39 associated with the gate 36 may be operated by the trap door 92 in the modified trap 5' as diagrammatically shown at 39' in Fig. 9.

In Fig. 10, there is illustrated a modified arrangement for sensing the presence of the animal in the passageway of either form of the trap. This arrangement can be substituted for the light source 54, the photoelectric cell PC and its associated amplifier 58, illustrated below the broken line 14 of Fig. 8, by connecting the conductors 61, 63, 72 and 74 of the diagram of Fig. 10 to the portions of similarly designated conductors above the horizontal broken line H of Fig. 8. In this modified sensing unit, the presence of the animal is detected electrostatically by thermionic means including a short wire or strip 100 serving as an antenna mounted on the trap preferably on the roof of the passageway and having a predetermined capacitance with the surrounding parts of the trap. The antenna 100 is connected to the input circuit of a combined vacuum tube oscillator and rectifier 101. This input circuit extends from grid 102 of the oscillator, conductor 103, through the tuning unit comprising the adjustable condenser 104 and the resistance 105 in multiple, upper winding 106 of the auto transformer, conductor 107 to the cathode 108 of the oscillator. The output circuit of the oscillator extends from the cathode 108, conductor 107, lower winding 109 of the auto transformer, conductor 110, resistor 111, to the plates or anodes 112 of the oscillator, the conductor 110 being connected to one side of the alternating current source over conductor 63. It will be noted that the input and output of this vacuum tube are inductively coupled through the windings 106 and 109 of the auto transformer so that the oscillator 101 oscillates at a frequency determined by the resonant circuit including the tuning units 104 and 105 as well as by the capacitance of the antenna 100 with the related parts of the trap. The vacuum tube 101 also includes an electrode or anode 113 which with the cathode of this tube and related connections, functions as a rectifier, the anode 113 being energized over conductor 61 leading to one side of the alternating current source. Current rectified by this portion of the vacuum tube 101 flows through the resistor 114 and thereby establishes a predetermined potential on the grid 115 of the vacuum tube amplifier 116. This potential is such that it prevents the flow of sufficient plate current in the output circuit of the amplifier including the cathode 117 and the plate 118 to energize the relay 71a included in series in this output circuit. When, however, an animal present in the passageway of the trap, modifies the capacitance between the antenna 100 and the related parts of the trap due to the capacity effect of the animal's body, the tuning of the oscillator 101 is changed and it ceases to oscillate. As a result of this, the potential on the grid 115 of the amplifier is modified so that an increased flow of plate current takes place in the output of the amplifier causing the relay 71a to operate. This relay functions in a manner similar to that of relay 71 in Fig. 8, to release the latch magnets of relay 71 in Fig. 8, to release the latch magnets 13 and 14 which in turn drop the gates 9 and 10. The remaining parts of the cycle of operation, in disposing of the animal, and in resetting the trap will be identical with that of the steps previously described.

While several embodiments of the invention have been disclosed, it will be understood that this invention is capable of still further modification and that this disclosure is intended to cover any variations, uses or adaptations of the invention falling within the scope of the appended claims.

What we claim is:

1. An animal trap comprising a receptacle having an open bottom closed by the floor or the like on which the trap is supported, said receptacle having openings in opposed walls thereof providing an unobstructed passageway therethrough, a gate for each end of said passageway, means out of contact with the animal but operable by the presence of an animal in said passageway for closing said gates, a compartment related to said receptacle, an opening in said passageway leading to said compartment, means for closing said opening, a passage leading from said compartment, and means in said passage for preventing retreat of the animal therefrom.

2. An animal trap provided with a passageway, said passageway having an inlet opening and an outlet opening, the floor of said passageway comprising the runway of the animal, gates for said inlet and outlet openings, means responsive to the presence of the animal in said passageway for closing said gate for said inlet opening, a chamber communicating with said passageway through said outlet, said inlet gate in the closed position providing a ramp leading to said outlet opening, means within said chamber for closing the gate for said outlet opening, a passage extending from said chamber and means in said passage for preventing the retreat of the animal therefrom.

3. An animal trap comprising an open bottom receptacle open at its ends to provide a passageway therethrough, the bottom of said receptacle being closed by the runway of said animal, gates for closing the respective ends of said passageway, a photoelectric cell at one side of said passageway, a light source on the opposite side of said passageway for throwing a beam of light across the passageway in the path of the animal onto said cell, means including an electrical circuit controlled by said cell for closing said gates when said beam is intercepted by an animal within said passageway, means for confining an animal trapped in said passageway, and means operable by the confining means for opening said gates.

4. An animal trap comprising a receptacle having an opening in a wall thereof, a gate for closing said opening, means responsive to the presence of an animal in said receptacle for closing said gate, a passage having an entrance opening communicating with said receptacle, said gate in its closed position providing a path to said passage, means in said passage operable by the trapped animal for closing the entrance opening, and means for opening said gate after the animal has been confined in said passage.

5. An animal trap comprising a receptacle having an open bottom closed only by the floor or the like on which the trap is supported, openings in opposed side walls of said receptacle providing an unobstructed passageway through said trap, gates for closing said openings, means out of contact with an animal present in the passageway but operable by the presence of the animal in the passageway for closing said gates, a passage communicating with said runway, one of said gates providing a path to said passage, and means operable after said animal is in said passage for opening said gates.

6. An animal trap comprising a receptacle having an open bottom and an opening in a side wall, said receptacle being adapted to be supported on the floor or the like where the animals to be trapped are accustomed to run, the floor or the like on which said receptacle is supported closing said open bottom and providing a runway for the animal accessible through said side wall opening, a normally open gate for closing said side wall opening, means out of contact with the animal and responsive to the presence of the animal in said receptacle for closing said gate.

7. An animal trap comprising a receptacle having an open bottom closed by the floor or the like on which the trap is supported, said receptacle having openings in opposed walls thereof providing an unobstructed passageway therethrough, a normally open gate for each of said openings, means out of contact with the animal but operable by the presence of the animal in said passageway for closing said gates.

8. An animal trap comprising a receptacle having an inlet opening and an outlet opening, normally open gates for closing said openings, means responsive to the presence of an animal in said receptacle and operable to close the gate for said inlet opening to trap the animal, a chamber communicating with said receptacle through said outlet opening, means within said chamber for closing the gate for said outlet opening, a passage communicating with said chamber, means for preventing the return of an animal from said passage to said chamber, and means operable by said last-mentioned means to open the gates for said inlet and outlet openings to reset said trap.

9. An animal trap comprising an open bottom receptacle open at its ends to provide an unobstructed passageway therethrough, the bottom of said receptacle being closed by the runway of said animal, normally open gates for closing the respective ends of said passageway, electronic means responsive to the presence of an animal in said runway for closing said gates to trap the animal, means for confining an animal trapped in said passageway, and means for opening said gates when an animal has been confined by said confining means.

10. An animal trap comprising an open bottom receptacle open at its ends to provide an unobstructed passageway therethrough, the bottom of said receptacle being closed by the runway of said animal, normally open gates for closing the respective ends of said passageway, electrostatically controlled means responsive to the presence of an animal in said passageway for closing said gates.

11. The method of capturing animals moving unobstructedly in their usual path, which method comprises electrically detecting the presence of an animal in a portion of said path, enclosing said portion of said path in response to said electrical detection, providing for the animal a pseudo path of escape, blocking the return of the animal along said pseudo path and disposing of the animal at the end of said pseudo path.

12. The method of capturing animals moving unobstructedly in their usual path, which method comprises electrically detecting the presence of an animal in a portion of said path, enclosing said portion of said path in response to said electrical detection, providing for the animal a pseudo path of escape, blocking the return of the animal along said pseudo path, disposing of the animal at the end of said pseudo path, and reopening said portion of said path in response to the blocking of said pseudo path.

WILLIAM J. VINCENT.
CORNELIUS M. STANTON.